Jan. 13, 1959    F. W. BROOKS, JR., ET AL    2,868,722
METHOD FOR PRODUCING A STABILIZED CRACKED DISTILLATE FUEL OIL
Filed Oct. 26, 1953    14 Sheets-Sheet 1

PHASE DIAGRAM FOR SYSTEM
POTASSIUM ISOBUTYRATE, POTASSIUM HYDROXIDE
AND WATER 90°F

INVENTORS
FRANK W. BROOKS, JR.
CLAIBORNE A. DUVAL, JR.
BY
AGENT

PHASE DIAGRAM FOR SYSTEM
POTASSIUM HYDROXIDE, WATER
BEAUMONT CRESYLATES AT 130°F

Jan. 13, 1959    F. W. BROOKS, JR., ET AL    2,868,722
METHOD FOR PRODUCING A STABILIZED CRACKED DISTILLATE FUEL OIL
Filed Oct. 26, 1953                           14 Sheets-Sheet 5

PHASE DIAGRAM FOR SYSTEM
SODIUM HYDROXIDE, WATER
BEAUMONT CRESYLATES AT 130°F

INVENTORS
FRANK W. BROOKS, JR.
CLAIBORNE A. DUVAL, JR.
BY
AGENT

Jan. 13, 1959  F. W. BROOKS, JR., ET AL  2,868,722
METHOD FOR PRODUCING A STABILIZED CRACKED DISTILLATE FUEL OIL
Filed Oct. 26, 1953  14 Sheets-Sheet 9

PHASE DIAGRAM FOR SYSTEM:
SODIUM HYDROXIDE-WATER-
PAULSBORO CRESYLATES AT 130°F

INVENTORS
FRANK W. BROOKS, JR.
CLAIBORNE A. DUVAL, JR.
BY Francis F. Johnston
AGENT Jan. 13, 1959     F. W. BROOKS, JR., ET AL     2,868,722
METHOD FOR PRODUCING A STABILIZED CRACKED DISTILLATE FUEL OIL

INVENTORS
FRANK W. BROOKS, JR.
CLAIBORNE A. DUVAL, JR.
BY
AGENT

United States Patent Office 2,868,722
Patented Jan. 13, 1959

2,868,722

METHOD FOR PRODUCING A STABILIZED CRACKED DISTILLATE FUEL OIL

Frank W. Brooks, Jr., and Claiborne A. Duval, Jr., Beaumont, Tex., assignors to Socony Mobil Oil Company, Inc., a corporation of New York Application October 26, 1953, Serial No. 388,385

6 Claims. (Cl. 208—263)

The present invention relates to the removal of acidic organic material from solutions thereof in organic fluids and, more particularly, to the recovery of phenolic compounds from admixtures of the same with one or more hydrocarbons. The present invention specifically relates to the stabilization of fuel oil by the removal of alkyl phenols present therein.

It has been discovered that aqueous solutions of the alkali metal salts of acidic organic material such as the carboxylic acids and phenols form with strong aqueous alkali metal hydroxide solutions a heterogeneous two-phase system from which the alkali metal salts of the acidic organic material can be readily separated by decantation or the like. This provides a commercially attractive method for extracting such acidic organic material from water-immiscible solutions thereof. For example, a solution of phenol or alkyl phenols in a hydrocarbon solvent such as gasoline can be extracted with a strong aqueous solution of alkali metal hydroxide whereby the acidic organic material reacts with the alkali metal hydroxide of the extracting solution to form alkali metal salt of the acidic organic material which alkali metal salts are substantially insoluble in the organic solvent for the acidic organic material (in this illustration—gasoline) and at concentrations critical of alkali metal hydroxide and alkali metal salt insoluble in the aqueous alkali metal hydroxide solution.

This application of the principles of the present invention has an economic advantage over the presently-employed, relatively weak, aqueous alkali metal hydroxide solutions containing about 10 to 15 percent alkali metal hydroxide by reason of the fact that the quantity of alkali metal hydroxide discarded when the solution is spent with respect to its ability to extract acidic organic material is greater when the prior art relatively weak solutions are employed than when using the relatively strong alkali metal hydroxide solutions of the present invention. That is to say, a prior art relatively weak alkali metal hydroxide solution loses its capability of extracting acidic organic material such as phenolic material before the entire alkali metal hydroxide content of the relatively weak prior art extracting solution has been neutralized. On the other hand, employing the relatively strong alkali metal hydroxide solutions of the present invention, the salt layer of the heterogeneous system contains very little free or uncombined alkali metal hydroxide.

It has also been discovered that there appears to be a correlation between the stability of fuel oil derived from petroleum and the concentration of phenolic material therein. Accordingly, the present invention provides a method for stabilizing fuel oils with respect to color and sedimentation by extracting the acidic organic material present in the fuel oil with aqueous alkali metal hydroxide solutions as more fully described hereinafter.

Illustrative of the removal of acidic organic material from admixture with water-immiscible liquids is the separation of fatty acids such as isobutyric from solutions of the same in hydrocarbon fluids and the separation of phenolic compounds from solutions of the same in hydrocarbon solvents for the same. For a better appreciation of the concentrations involved, reference is made to the drawings in which.

Figure 12:
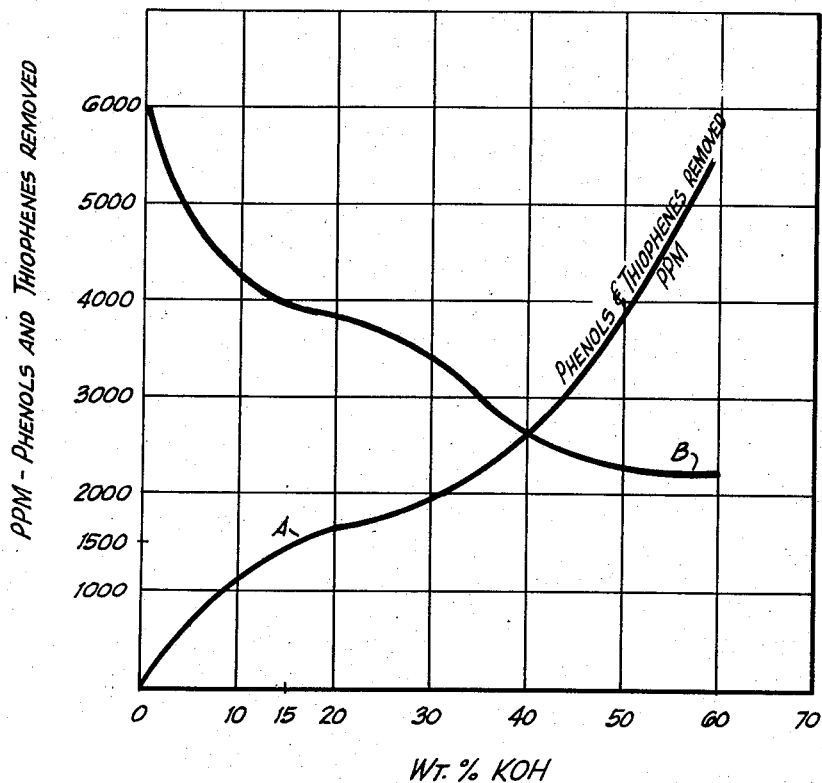

Figure 12 is a graph showing the relation between the color of an oil treated at an oil-to-aqueous potash solution ratio of 5:1 employing potash solutions having various concentrations of potash and the concentration of potash after the treated oil had been stored in a glass bottle for 24 hours at 212° F. (It has been found that storage at 212° F. for 24 hours is comparable with storage at 100° F. for two months as an indication of the stability of the treated oil.)

Figure 13:
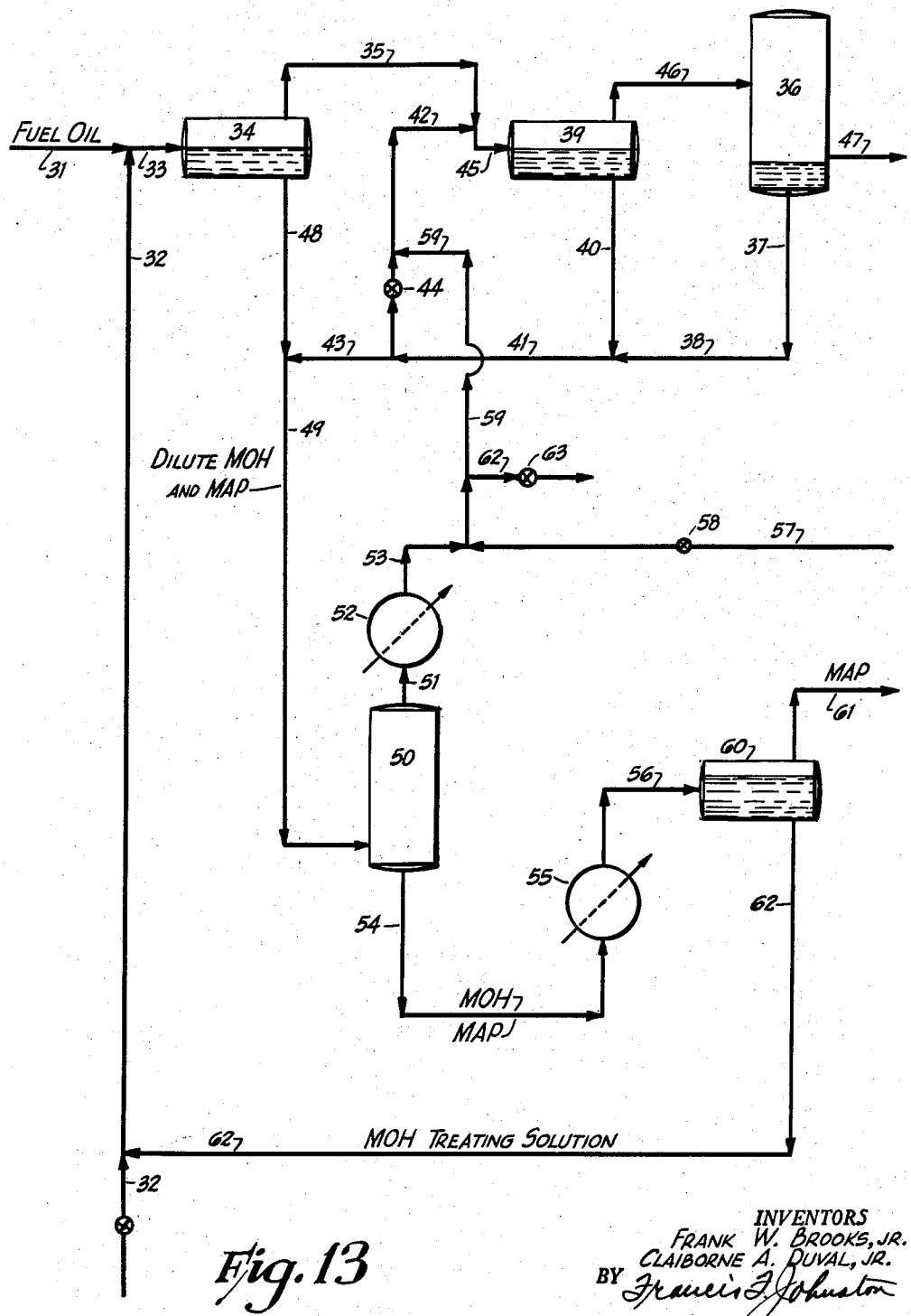
Figure 14:
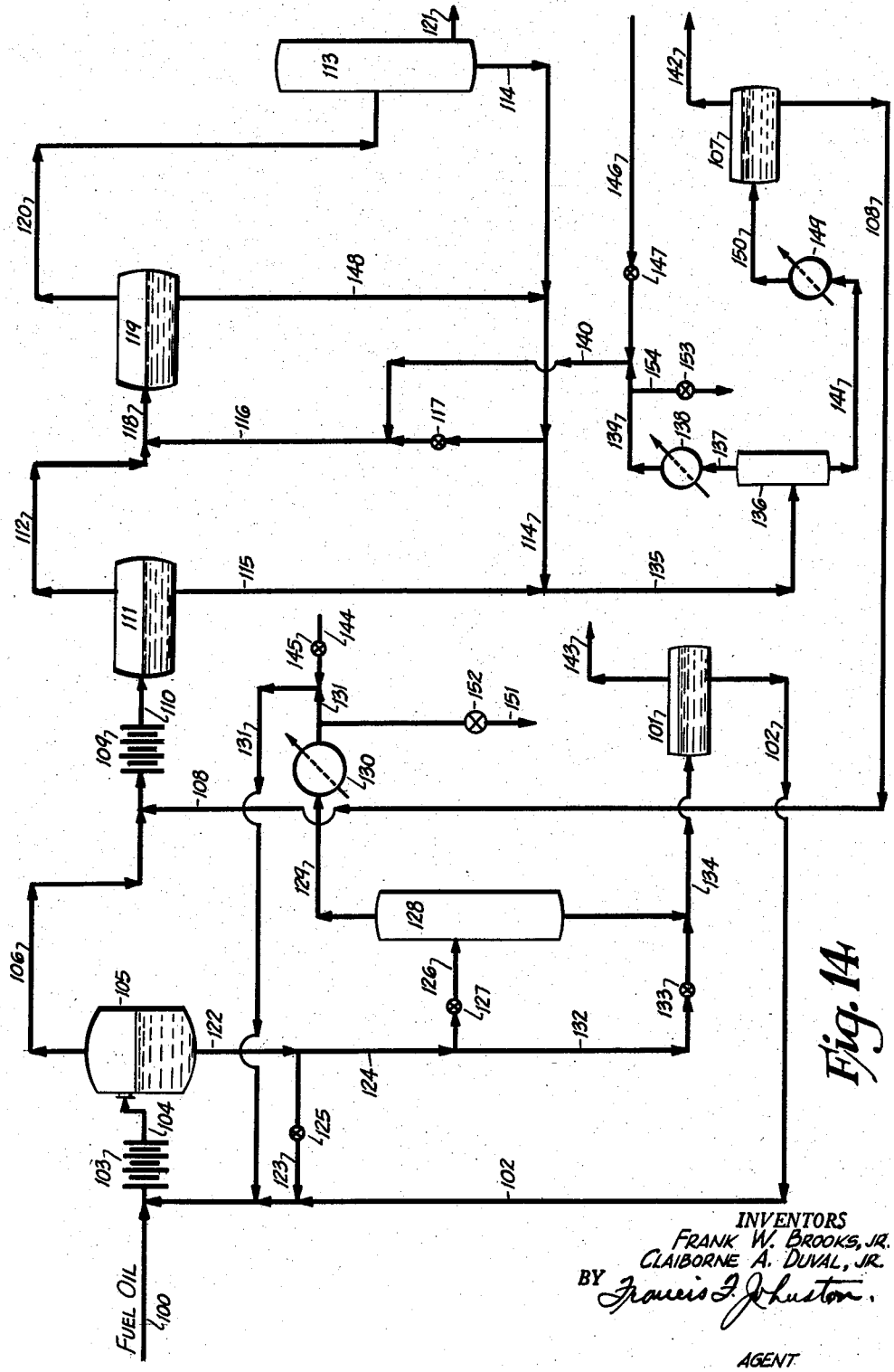

Figure 13 is a highly schematic flow-sheet illustrative of a method of treating fuel oil with an aqueous solution of alkali metal hydroxide to stabilize the fuel oil with respect to color and/or sediment wherein the fouled aqueous alkali metal hydroxide solution is regenerated; and Figure 14 is a highly schematic flow-sheet illustrative of a method of treating fuel oil first with an aqueous solution of caustic soda and then with an aqueous solution of caustic potash to stabilize the fuel oil with respect to color and/or sediment wherein both fouled aqueous alkali metal hydroxide solutions are regenerated.

In general, it has been found that alkali metal salts of acidic organic material tend to form a second fluid phase in contact with aqueous alkali metal hydroxide solutions having an alkali metal hydroxide concentration in excess of a minimum dependent upon the organic acidic material. The effective concentrations are readily determined for each specific member of the group. A more elaborate investigation provides data from which ternary diagrams such as those of Figures 1 through 9 can be plotted.

Figure 1:
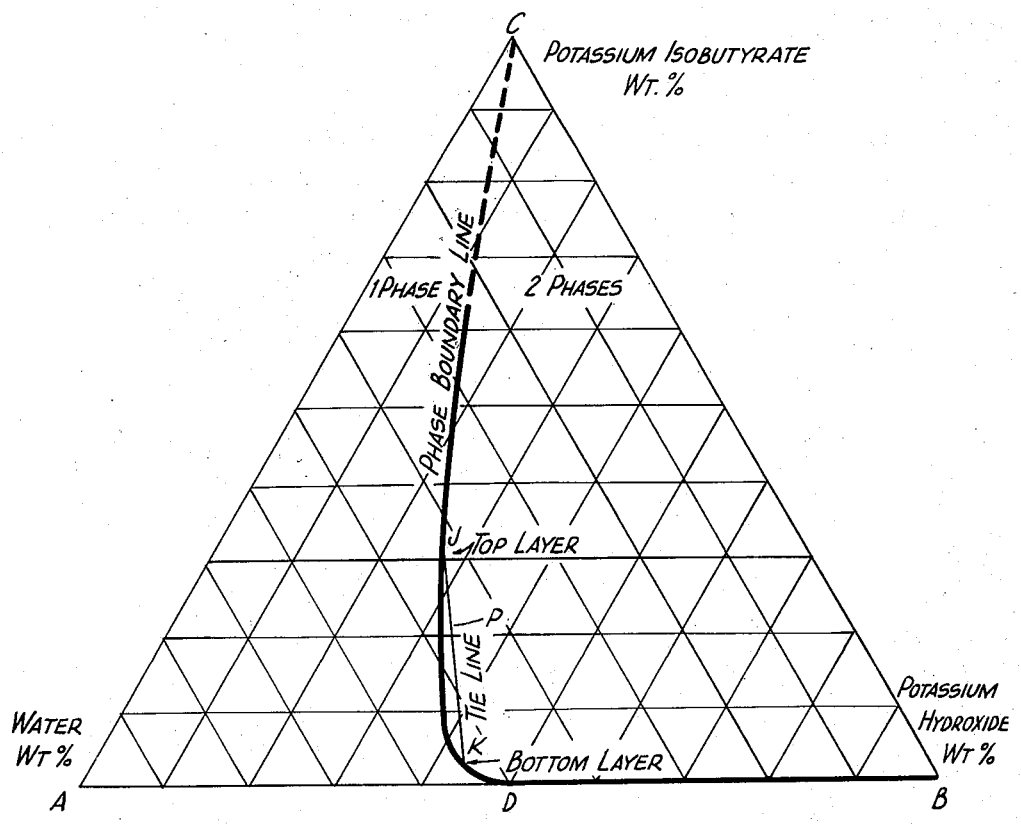
Figure 1 is a ternary diagram for data obtained at 90° F. for the system potassium hydroxide-potassium isobutyrate-water.

Referring to Figure 1 which is the ternary diagram of the data obtained at 90° F. for the system water-potassium salts of isobutyric acid and potassium hydroxide, those skilled in the art will readily understand that at concentrations of potassium hydroxide in excess of about 13 weight percent to about 60 weight percent potassium isobutyrate forms a second immiscible phase. That is to say, that mixtures having compositions represented by points on the "Phase boundary line" CD and compositions represented by points to the right of "Phase boundary line" CD separate into two phases one of which is an aqueous solution of potassium isobutyrate and a small amount of potassium hydroxide, while the other phase is an aqueous solution of potassium hydroxide containing substantially no isobutyrate. For example, an aqueous solution of potassium hydroxide and potassium isobutyrate having a composition represented by any point on the line JK will separate into an upper layer or phase having a composition represented by the point J and a lower layer or phase having a composition represented by the point K.

Thus, for example, consider a mixture of potassium hydroxide, potassium isobutyrate and water containing 39% KOH, 10% KIB (potassium isobutyrate) and 51% water by weight will separate into two phases, an upper KIB phase or layer, and a lower KOH phase or layer. The upper KIB phase or layer will contain 28 weight percent KOH, 30 weight percent KIB and the balance 42 weight percent, water. The lower phase or layer in equilibrium with this upper phase or layer will contain 43 weight percent KOH, 3 weight percent KIB and the balance, 54 weight percent water.

It is to be noted that the salt layer for mixtures represented by points to the right of the phase boundary line are in many instances non-fluid. This can be overcome by adding a water-soluble co-solvent or liquefier to the system in small amounts. Suitable liquefiers or co-solvents are the alcohols and ketones having up to 5 carbon atoms in the molecule and alkyl phenols. It has been found that less than 1% alcohol is effective as a liquefier.

Figure 2:
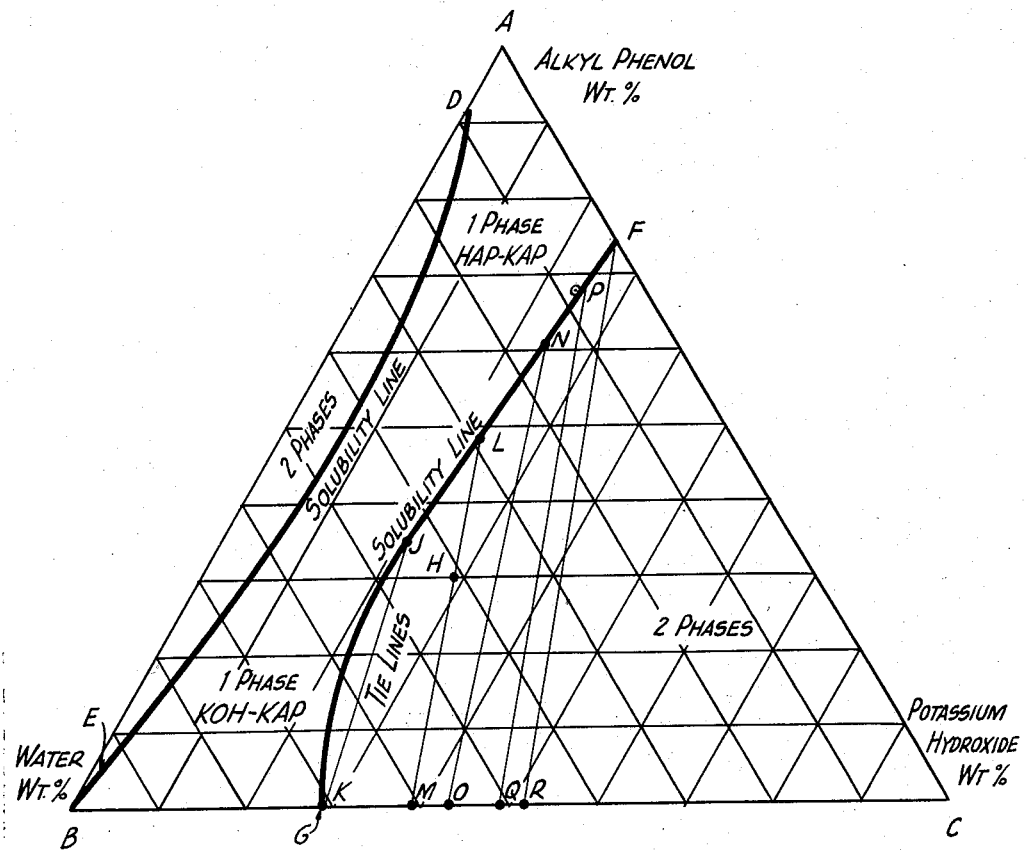
Figure 2 is a ternary diagram for data obtained at 130° F. for the system water-potassium hydroxide-alkyl phenols having an average molecular weight of about 150.

Referring now to Figure 2, it will be noted that the system water-potassium hydroxide-alkyl phenols having an average molecular weight of about 150 is a heterogeneous, two-phase system when the concentrations of the three components are those represented by points on line DE, or by points in the area DEB, or by points on the line FG, or by points in the area FGC. However, since for economic reasons it is presently preferred to use concentrated solutions, this discussion will be directed primarily to the area FGC.

Accordingly, a solution containing 29 weight percent KOH, 30 weight percent HAP (alkyl phenols) and 41 weight percent water (represented by point H) will separate into an upper KAP layer or phase containing 23 weight percent KOH, 49 weight percent alkyl phenols and 28 weight percent water in equilibrium with a lower KOH layer or phase containing 39 weight percent KOH, and 61 weight percent water. In other words, any mixture the composition of which is represented by a point on line LM will separate into two phases, the upper or KAP phase or layer having a composition represented by point L, and the lower phase or layer in equilibrium therewith having a composition represented by point M. Similarly, for other mixtures of potassium hydroxide, alkyl phenols and water, the compositions of which are represented by points on lines JK, NO, PQ and FR, the compositions of the upper phases or layers are represented by the points J, N, P and F respectively while the compositions of the lower layers or phases in equilibrium with the corresponding upper layers or phases are represented by the points K, O, Q and R respectively. Since there must be sufficient KOH in the extracting solution to neutralize the alkyl phenols extracted, the concentration of the KOH in the extracting solution must always be sufficiently in excess of the KOH concentration required in the lower layer for formation of two phases to neutralize the alkyl phenols present in the upper layer.

Figure 3:
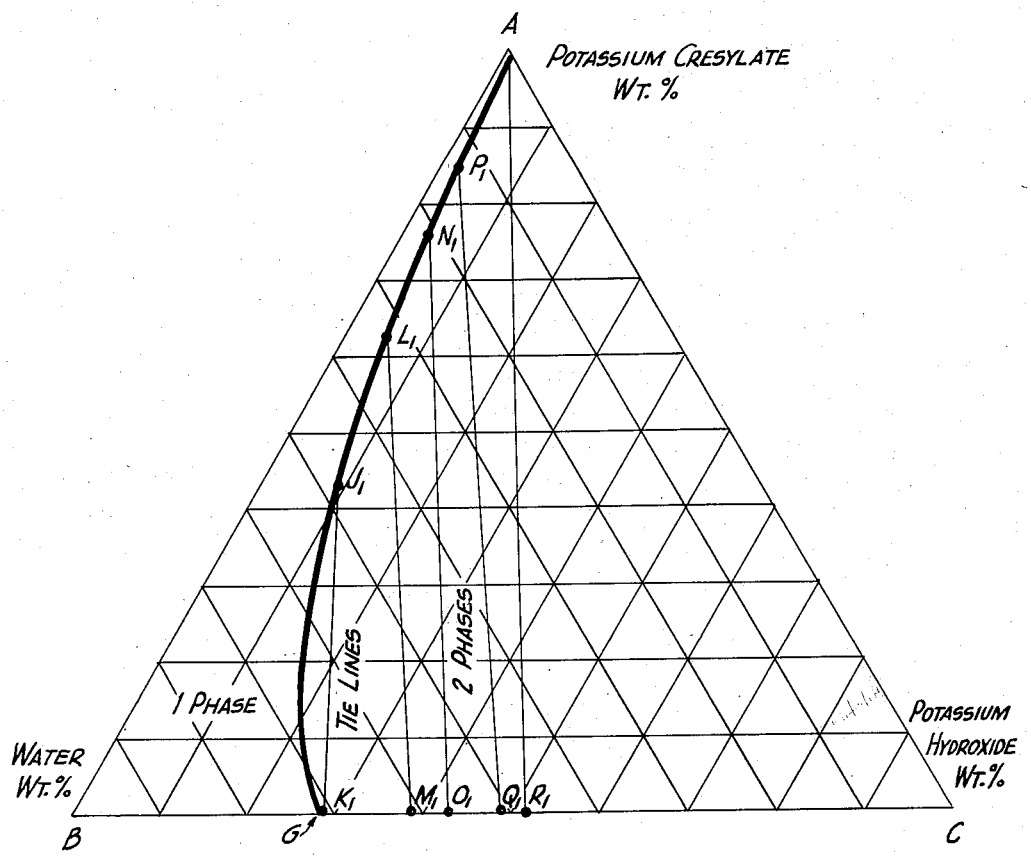
Figure 3 is a ternary diagram for data obtained at 130° F. for the system water-potassium hydroxide-potassium salts of alkyl phenols having an average molecular weight of about 150.

Upon referring to Figure 3 the concentration of potassium salts of the alkyl phenols, i. e., potassium alkyl phenolates (KAP) in the upper layers or phases J, N, P, and F, can be determined readily. Thus, in upper layer of Figure 2 containing 23 weight percent KOH and 49 weight percent alkyl phenols, the concentration of free unneutralized KOH is 5 weight percent and the concentration of potassium phenolate is 62 weight percent ($L_1$, Figure 3).

Figure 4:
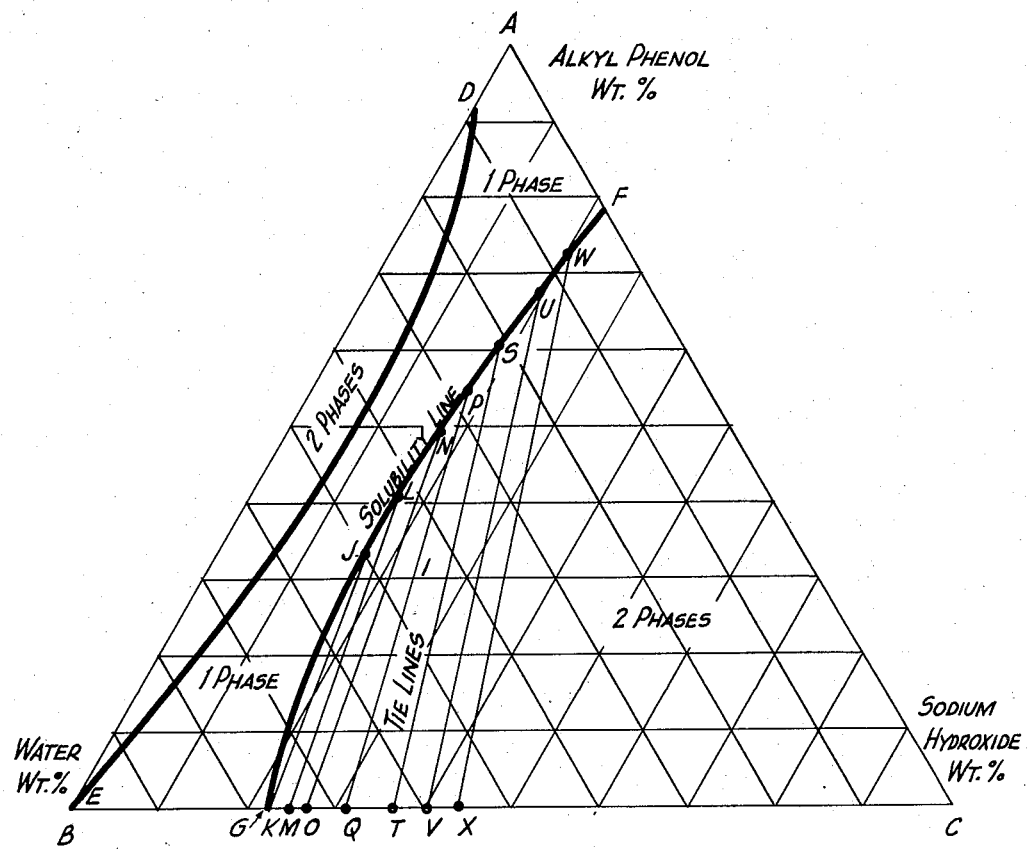
Figure 4 is a ternary diagram for data obtained at 130° F. for the system water-sodium hydroxide-alkyl phenols having an average molecular weight of about 150.
Figure 5:
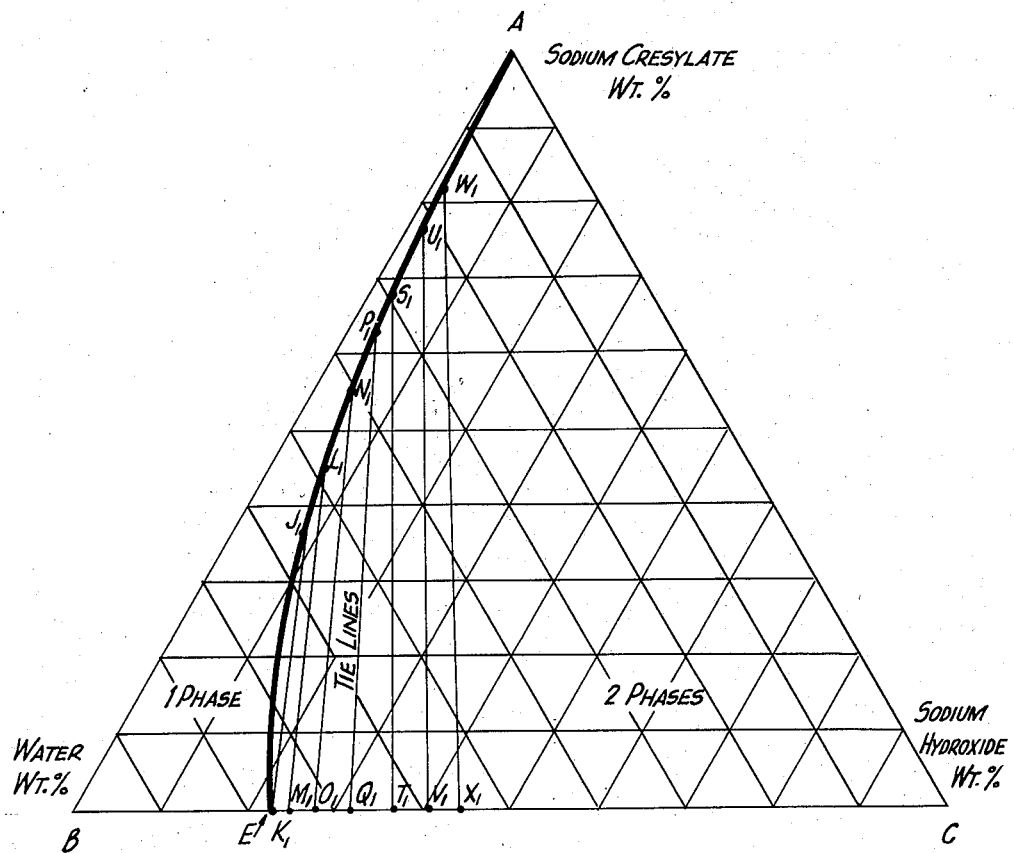
Figure 5 is a ternary diagram for data obtained at 130° F. for the system water-sodium hydroxide-sodium salts of alkyl phenols having an average molecular weight of about 150.

From Figures 4 and 5 similar information can be obtained. Thus, a two-phase system exists when the three components sodium hydroxide, alkyl phenol (HAP) and water are present in the solution in the concentrations represented by points on the line DE or by points in the area to the left of line DE, or by points along the line FG or by points in the area FGC. As in Figures 2 and 3 the tie lines JK, LM, NO, PQ, ST, UV and WX are drawn through points representing the compositions of mixtures of sodium hydroxide, alkyl phenols (HAP) and water which form two phases, the upper phases having compositions represented by the points J, L, N, P, S, U and W and the lower phases having compositions represented by the points K, M, O, Q, T, V and X. Thus, for example, a mixture having a composition represented by point 1 on tie line PQ comprises 24 weight percent NaOH, 30 weight percent alkyl phenols (HAP) and the balance, 46 weight percent water. This mixture will separate into an upper HAP phase containing 18 weight percent NaOH, 54 weight percent alkyl phenols (HAP) and 28 weight percent water in equilibrium with a lower phase comprising 31 weight percent NaOH and 69 weight percent water. In other words (referring to Figure 5) upper layer of phase $P_1$ corresponding to upper layer or phase P (Figure 4) comprises 4 weight percent NaOH, 62 weight percent sodium alkyl phenolate (NaAP) and 34 weight percent water.

Figure 6:
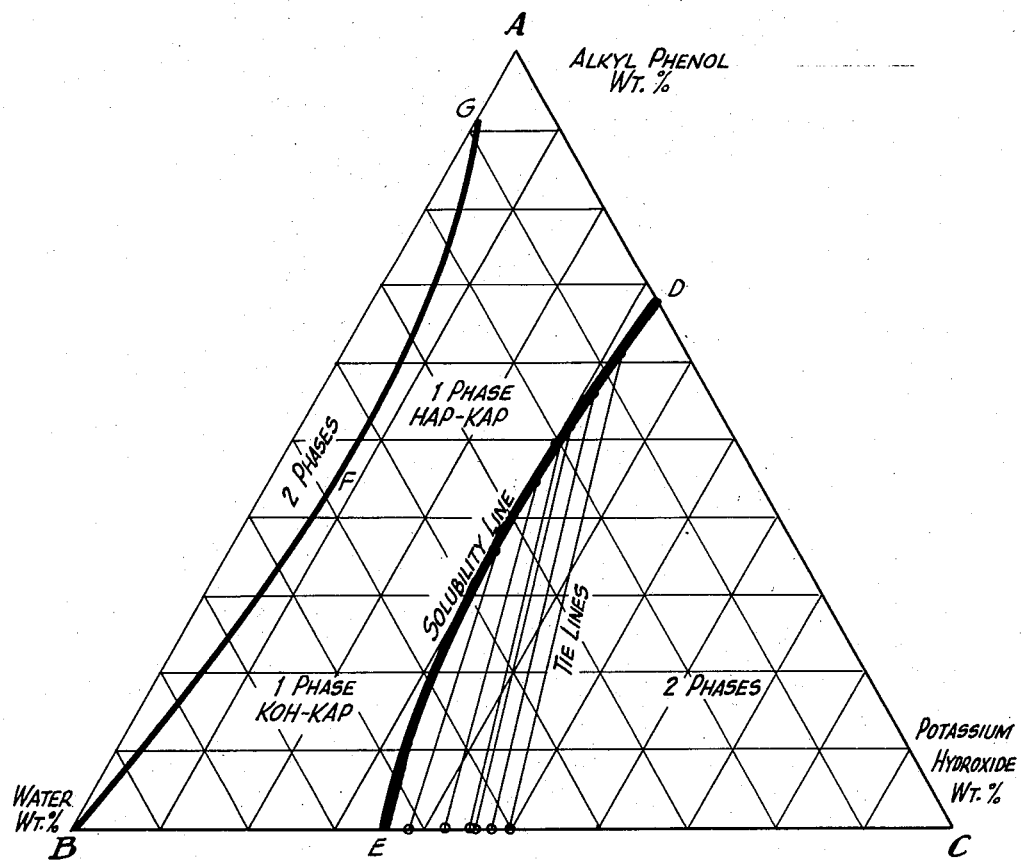
Figure 6 is a ternary diagram for data obtained at 130° F. for the system water-potassium hydroxide-alkyl phenols having an average molecular weight of about 150.

Figure 6 is a ternary diagram showing the physical condition at 130° F. of mixtures of potassium hydroxide, alkyl phenols from stock treated at Paulsboro, New Jersey, and water. It will be noted that the system forms two heterogeneous, two-phase systems for compositions represented by points within the areas GFB and DEC while a one-phase system exists for compositions represented by the area AGBED.

Figure 7:
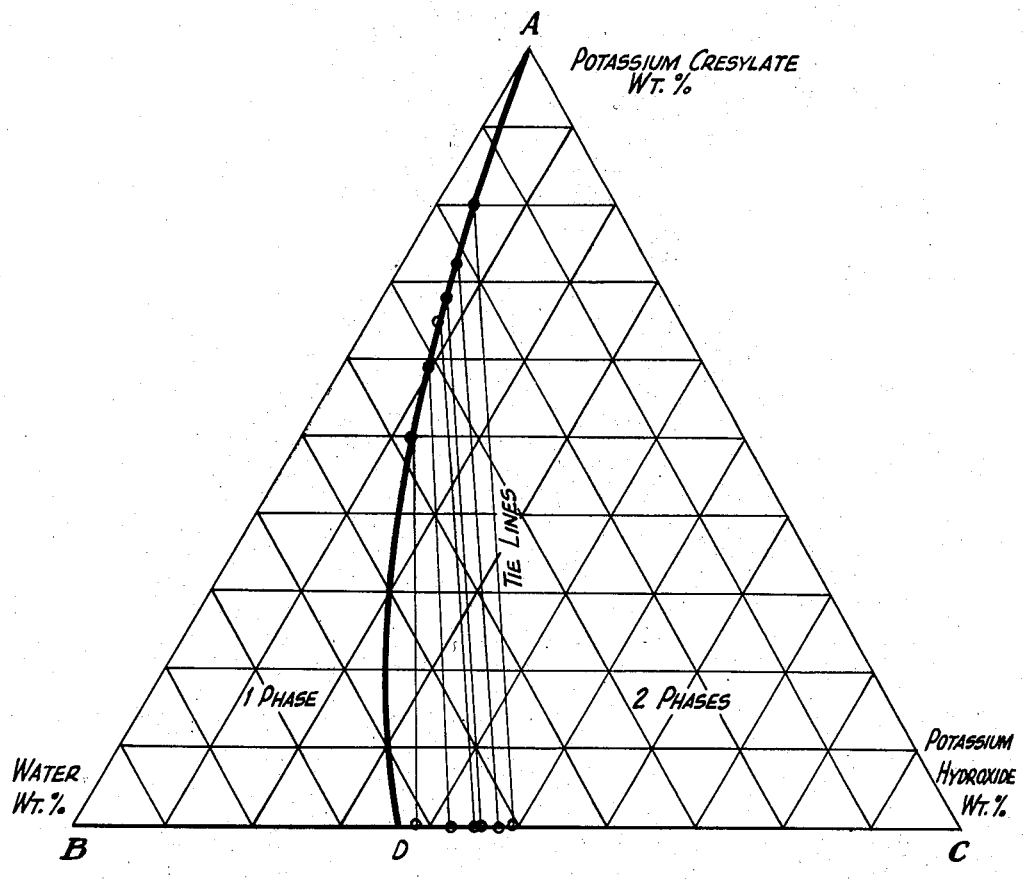
Figure 7 is a ternary diagram for data obtained at 130° F. for the system water-potassium hydroxide-potassium salts of alkyl phenols having an average molecular weight of about 150.

Figure 7 is a ternary diagram for the system potassium hydroxide, potassium salts of alkyl phenols derived from stock treated at Paulsboro, New Jersey, and water. It will be noted that in a system in which there is free, i. e., uncombined, potassium hydroxide, the secondary area of heterogeneous mixtures does not exist and only one area representing compositions forming two-phase systems is presented.

Figure 8:
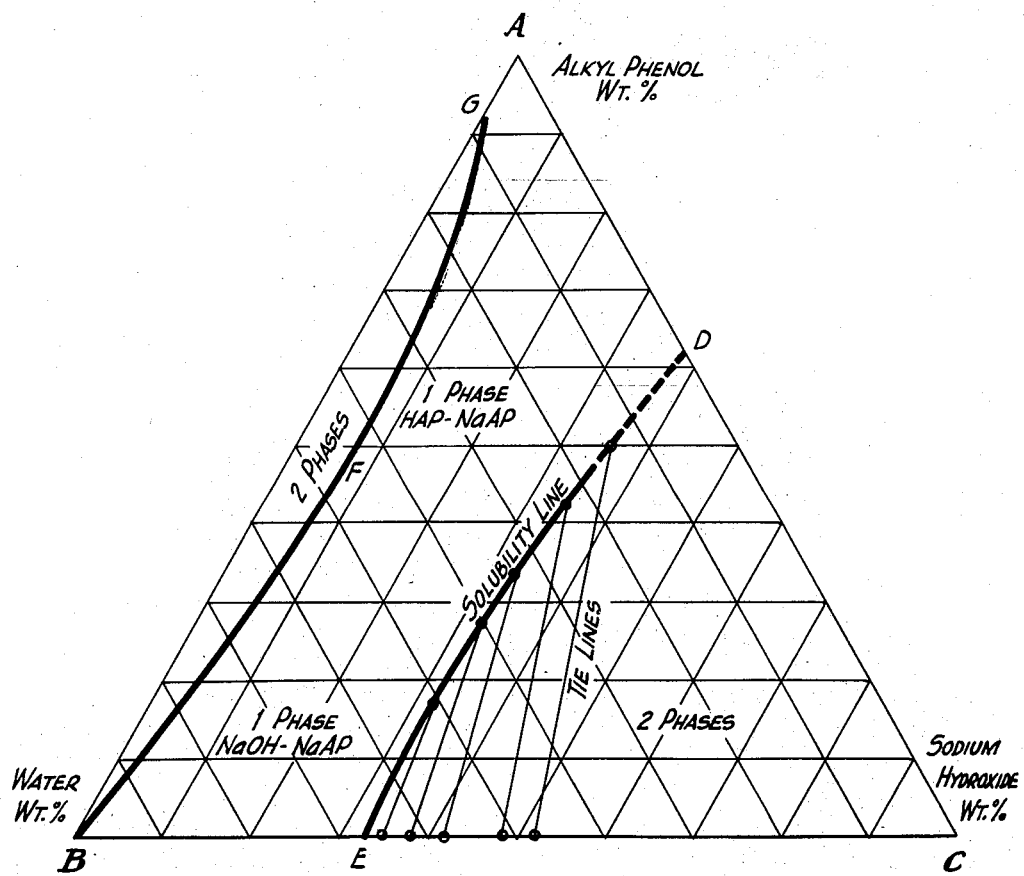
Figure 8 is a ternary diagram for data obtained at 130° F. for the system water-sodium hydroxide-alkyl phenols having an average molecular weight of about 150.
Figure 9:
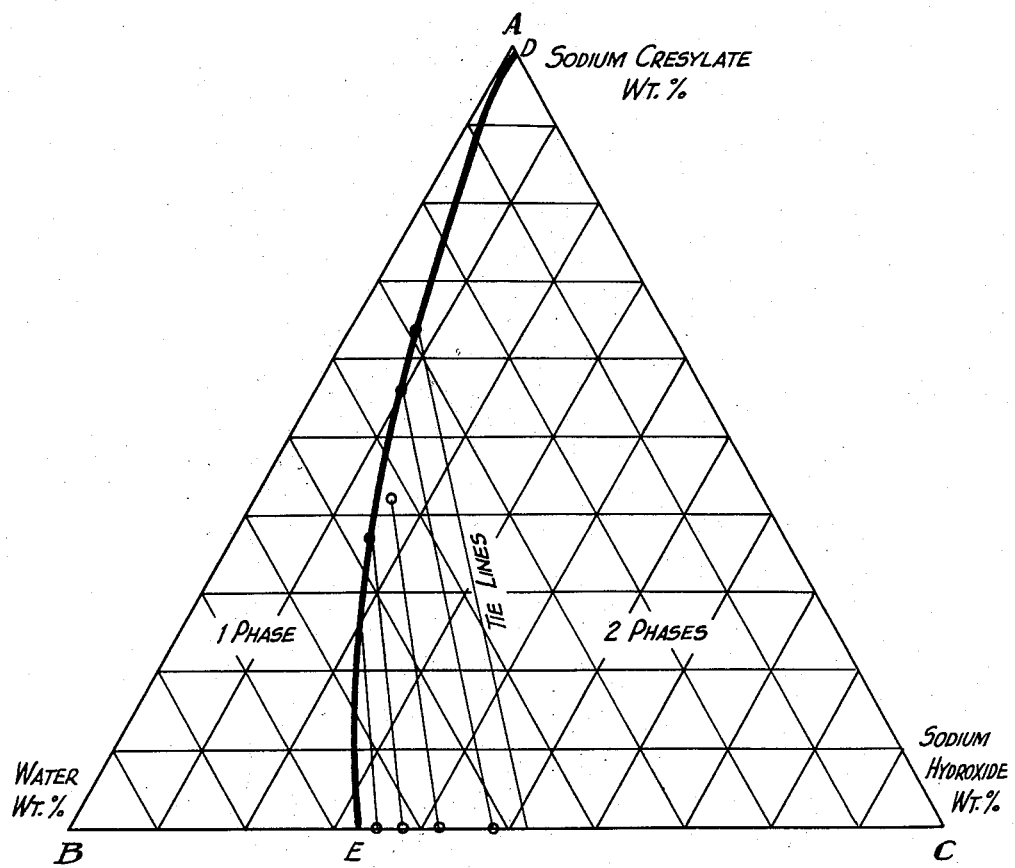
Figure 9 is a ternary diagram for data obtained at 130° F. for the system water-sodium hydroxide-sodium salts of alkyl phenols having an average molecular weight of about 150.

Similarly for the sodium system, in Figure 8 there are two areas representing compositions forming two-phase systems, to wit: area GFB and area DEC, while in Figure 9 there is but a single area, DEC, representing compositions forming two-phase systems.

Figure 10:
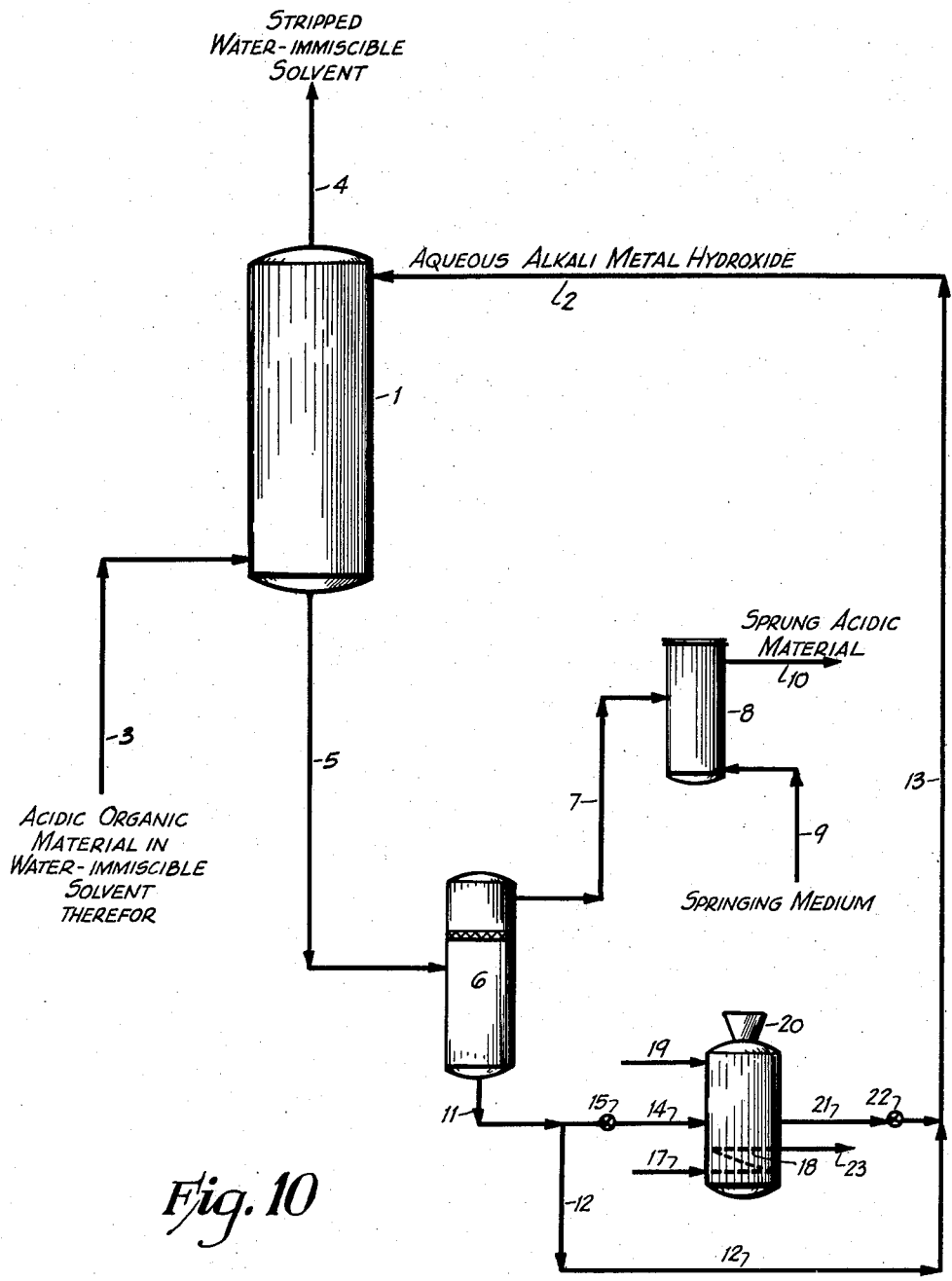
Figure 10 is a highly schematic flow-sheet of a method of extracting acidic organic material, the aqueous solutions of the alkali metal salts of which are immiscible with concentrated aqueous solutions of the alkali metal hydroxide and recovering the aforesaid acidic organic material.

The characteristics of aqueous solutions of alkali metal hydroxide and alkali metal salts of acidic organic material such as fatty acids and phenolic material illustrated by the ternary diagrams Figures 1 through 9 can be utilized in accordance with the principles of the present invention to extract acidic organic material from solutions thereof in water-immiscible solvents. Thus, for example, solutions of phenolic material in water-immiscible organic solvent, for example, an aliphatic or alicyclic or carbocyclic hydrocarbon or mixture of hydrocarbons such as gasoline, naphtha, fuel oil, etc., can be intimately mixed with a concentrated solution of an alkali metal hydroxide of such strength that the mixture of extracted acidic organic material, alkali metal hydroxide and water forms two separable layers, the alkali metal hydroxide solution containing extracted acidic organic material separated from the extracted solvent, the fat treating solution separated into two layers, the upper layer containing the alkali metal salt of the extracted acidic organic material and the lower layer comprising an aqueous alkali metal hydroxide solution, the upper layer treated to spring or release and recover the acidic organic material and the lower layer with or without fortifying used to extract further amounts of acidic organic material from solutions of the same in an organic water-immiscible solvent. The operation can be conducted in a batch-wise or continuous manner. A method of extracting acidic organic material from solutions thereof in a water-immiscible solvent such as a hydrocarbon solvent, for example, naphtha, gasoline, etc., is shown in a highly schematic manner in Figure 10.

The extracting solution is an aqueous alkali metal hydroxide solution preferably of about 50 weight percent concentration. Solutions of lower concentration can be used but these require more frequent revivification and hence closer control to maintain the necessary concentration of alkali metal hydroxide. There are two causes for the decrease in concentration of alkali metal hydroxide, to wit: (1) neutralization by the acidic organic material extracted and (2) the water of reaction. Therefore, although any concentration of alkali metal hydroxide can be used which will provide a fat solution capable of forming a heterogeneous system, it is preferred to use alkali metal hydroxide solutions containing 40 to 50 weight percent alkali metal hydroxide.

The solution of acidic organic material in a water-immiscible organic solvent substantially inert to strong aqueous alkali metal hydroxide solutions flows from a source not shown through line 3 into contactor 1. Aqueous alkali metal hydroxide extraction solution flows from separator 6 through lines 11, 12, 13 and 2 to contactor 1. The aqueous extraction solution flows downward through contactor 1 counter-current to the solution of acidic organic material flowing upwardly through contactor 1. (Of course, the solution of acidic organic material must have a density sufficiently less than that of the aqueous extraction solution to permit gravity separation.) The contactor 1 can provide a single or a plurality of extraction stages. The extracted solvent flows from contactor 1 through line 4 to be used to dissolve more acidic organic material. The fat extraction solution containing the extracted acidic organic material flows from contactor 1 through line 5 to separator 6 wherein the alkali metal salt of the extracted acidic organic material forms the upper layer in equilibrium with a lower aqueous alkali metal hydroxide solution.

The upper alkali metal salt layer flows from separator 6 through line 7 to springer 8. Springing medium of acidic nature such as a stronger acid than the extracted acidic organic material flows from a source not shown through line 9 into springer 8. Thus, when springing isobutyric acid from its alkali metal salts, sulfuric acid can be used. When springing phenolic material from the alkali metal salts thereof, sulfuric acid, carbon dioxide or flue gas can be used. The freed or sprung acidic organic material flows from springer 8 through line 10 to further treatment and/or storage and/or distribution.

The lower aqueous alkali metal hydroxide solution in separator 6 flows through lines 11, 12, 13 and 2 back to contactor 1 for use in extracting further amounts of acidic organic material.

When the water of reaction or other causes of dilution lower the concentration of the aqueous alkali metal hydroxide solution below that at which it is preferred to operate, the concentration of the aqueous alkali metal hydroxide can be raised to the operating concentration in any suitable manner. That is to say, the whole or a part of the aqueous alkali metal hydroxide solution flowing through line 11 can be diverted from line 12 to line 14 under control of valve 15 and passed to rivivifier 16.

In revivifier 16 the concentration of the alkali metal hydroxide can be increased by passing steam from a source not shown through line 17 to coil 18 and out through line 23 whereby the alkali metal hydroxide solution is concentrated by the evaporation of a part of the water or sufficient solid alkali metal hydroxide is added to the solution through hopper 20 to raise the concentration to the extraction concentration or a more concentrated solution of alkali metal hydroxide than the extraction solution can be introduced into revivifier 16 through line 19. Thus, for example, when a 50 weight percent sodium hydroxide solution is used for extraction, the weakened solution can be brought up to extraction strength by adding a sufficient amount of a 70 to 73 weight percent aqueous solution of sodium hydroxide.

The extraction solution after revivification flows from revivifier 16 through line 21 under control of valve 22 to line 13. The alkali metal solution with or without revivification flows through lines 13 and 2 to the contactor 1.

Another application of the principles of the present invention is to the stabilization of fuel oil with respect to color and/or sediment. Consequently, the present invention provides a method of stabilizing fuel oils with respect to color and sediment employing aqueous solutions of alkali metal hydroxide in which the constituents of the fuel oil which appear to be the source, per se, or potentially, of the instability are separated from the alkali metal hydroxide solution by gravity.

Many distillate fuel oils of the type used both in domestic, i. e., home burners or industrial burners deteriorate in storage either with respect to color or sedimentation or both. Several methods of treatment are commonly known to increase the stability of these fuel oils although no completely satisfactory explanation of the cause of the instability nor of the mechanism whereby the fuel oil is stabilized has been advanced and accepted by those investigating this problem. Three commonly employed methods for stabilizing these fuel oils are acid treating, caustic treating and solvent treating.

In the stabilization of such fuel oils by caustic treatment, it has been practice to contact the oil with aqueous solutions of alkali metal hydroxide followed by separation of the treated fuel oil from the aqueous solution. Thereafter the treated oil is water-washed to remove entrained alkali and the wash water separated from the treated oil. In general, the aforesaid process is a batch process and the alkali metal hydroxide solution is discarded. After the alkali metal hydroxide solution has been used to treat several batches of oil, it likewise is discarded. Consequently, the art, for economic reasons, has been limited to the use of the cheaper sodium hydroxide rather than the costlier potassium hydroxide. On the other hand, as clearly demonstrated in Figure 11 of the drawings (discussed hereinafter), potassium hydroxide solutions are more effective to produce a color-stable oil of required color than sodium hydroxide solutions. Accordingly, it is necessary to provide for a means whereby potassium hydroxide solutions can be used at economically attractive levels. This end can be achieved by means of a suitable method of regenerating the fouled potash solutions. It has now been discovered that aqueous solutions of alkali metal hydroxides, i. e., NaOH and KOH, can be regenerated for re-use and that certain advantages can be gained by the use of a combination of treatments with caustic soda followed by treatment with caustic potash. Accordingly, the present invention has among its objects provision of a means for stabilizing fuel oils with respect to color and/or sedimentation employing aqueous solutions of caustic soda or of caustic potash or of caustic soda followed by caustic potash in which the fouled solutions are regenerated.

It has been found that a satisfactorily stabilized oil is one which has an A. S. T. M. color not darker than 2½ and a sediment not in excess of 2 milligrams per 100 milliliters after storage in a glass bottle at 100° F. for two months. A more highly accelerated test giving comparable results is one in which the treated oil is stored for 24 hours at 212° F. in a glass bottle. The data plotted in Figure 11 are those obtained by treating a fuel oil with aqueous solutions of caustic soda or caustic potash at an oil-to-solution ratio of 5:1, separating the treated oil from the fouled aqueous solution, water-washing the treated oil, storing the treated oil in glass bottles for two months at 100° F. and determining the color at the end of the storage period.

Figure 11:
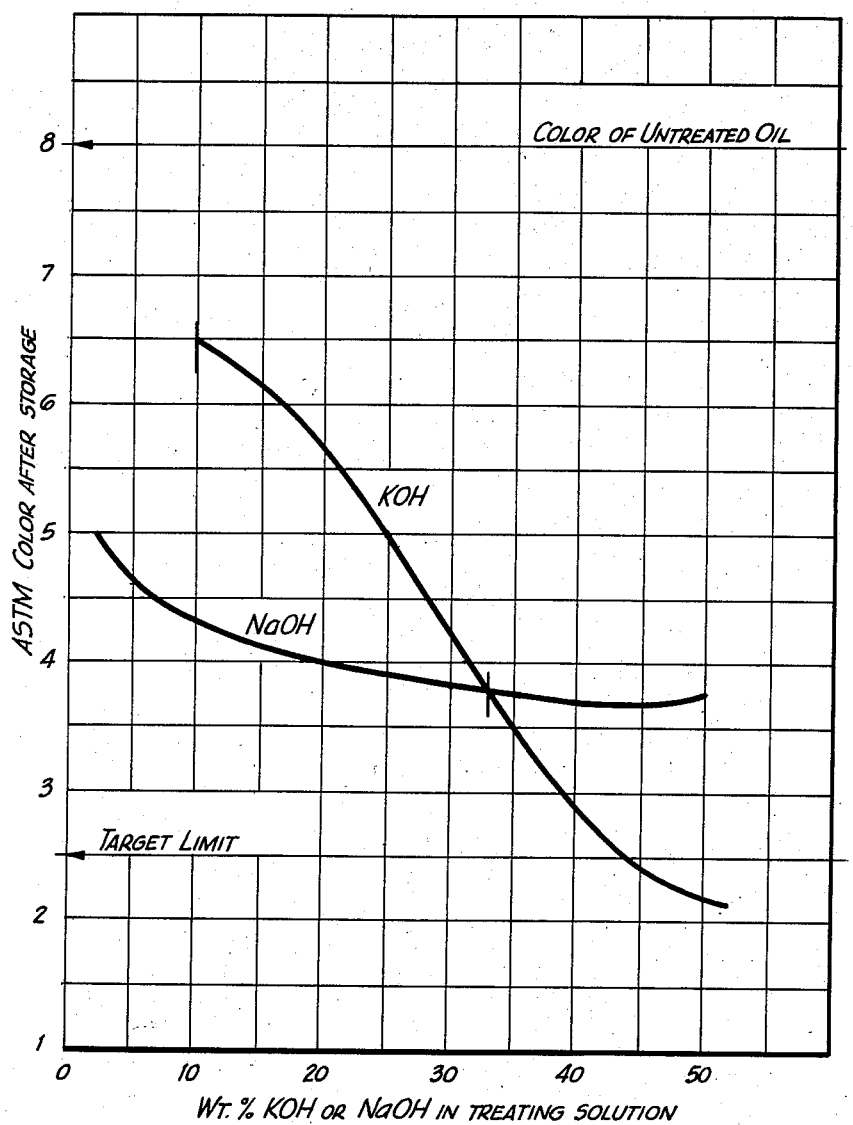
Figure 11 is a graph showing the relation between the color of an oil treated with 20 volume percent of treating solution containing various quantities of caustic soda or caustic potash and the concentration of the alkali metal hydroxide after the treated oil had been stored in a glass bottle at 100° F. for two months.

Upon reference to Figure 11, three facts are immediately apparent: (1) that for a given increment in the concentration of alkali metal hydroxide at the same ratio of oil-to-alkali metal hydroxide solution, caustic potash is more effective than caustic soda in removing those components of the oil which, per se or potentially, are the source of the oil darkening bodies, (2) that solutions containing 35 weight percent and more of caustic potash are superior to solutions containing 35 weight percent and more of caustic soda, and (3) that while the effectiveness of solutions containing 35 weight percent or more of caustic potash to remove color bodies increases, the effectiveness of solutions containing more than 35 weight percent of caustic soda is approximately the same as that of a solution containing about 30 to 35 weight percent caustic soda. In other words, aqueous treating solutions containing approximately 35 weight percent caustic potash are superior to aqueous treating solutions containing 50 weight percent caustic soda when used at the same ratio of oil-to-treating solution. This indicates that strong, i. e., containing 35 weight percent or more, caustic potash solutions extract a greater quantity and/or a different color darkening material than caustic soda solutions of comparable concentration. Accordingly, for economic reasons when treating unstable fuel oils it is advantageous to use as a first treating solution an aqueous solution containing about 15 to about 35 weight percent caustic soda at an oil-to-solution ratio of about 4:1 to about 20:1, to separate the treated oil from the aqueous caustic soda solution, and in a second operation treat the partially treated oil with an aqueous caustic potash solution containing at least about 35 weight percent caustic potash at an oil-to-solution ratio of about 5:1 to about 200:1.

Referring to Figure 12, an unstable fuel oil distillate from a catalytic cracking conversion was treated at a volumetric oil-to-solution ratio of 5:1. The color stability was determined by storage in glass bottles at 212° F. for 24 hours. The data thus obtained are tabulated hereinafter and plotted in Figure 12.

Table I

| Weight Percent KOH in Treating Solution | Color of Oil After Treat | Color of Oil After 24 Hrs. at 212° F.* | P. p. m. of Acidic Material Removed from Oil |
| --- | --- | --- | --- |
| None | 1½ | 6– | None |
| 7.6 | 2– | 4½ | 1,148 |
| 16.4 | 2– | 4– | 1,607 |
| 21.8 | 2– | 4– | 1,722 |
| 24.4 | 2– | 4– | 1,837 |
| 27.2 | 2– | 3½ | 1,902 |
| 29.3 | 2– | 4– | 1,980 |
| 31.9 | 2– | 3– | 2,055 |
| 37.6 | 2– | 3 | 2,400 |
| 44.0 | 2– | 2½ | 2,975 |
| 50.5 | 2– | 2½ | 4,133 |
| 56.6 | 2– | 3– | 5,229 |

Note.—(*)=lighter than the numerical value given.

Analysis of the material extracted from fuel oil indicates that the major proportion of the acidic materials extracted by both 5 weight percent aqueous caustic soda and 42.6 weight percent aqueous caustic potash consists of phenols and thiophenols. Some of the acidic material extracted by strong aqueous caustic potash solutions are insoluble in dilute caustic potash solutions. The distribution of the compounds extracted by 5 weight percent caustic soda and 43° Bé. (42 weight percent) caustic potash is given in Table II.

Table II

| Soluble in 5 Wt. Percent KOH | Parts Per Million | | |
| --- | --- | --- | --- |
| | Extracted by 5 Wt. Percent NaOH | Extracted by 42 Wt. Percent KOH | Difference |
| Aryl Mercaptans: | | | |
| Methyl and polymethylthiophenols | 145 | 348 | 203 |
| Polynuclear mercaptans | 36 | 87 | 51 |
| Phenols: | | | |
| Pylenols | 102 | 244 | 142 |
| Tri and tetramethylphenols, Arylhydroxy indane and tetraline derivatives | 707 | 1,696 | 989 |
| Alpha-Naphthol | 6 | 15 | 9 |
| Beta-Naphthol | 51 | 123 | 72 |
| 4-Hydroxybiphenol | 51 | 123 | 72 |
| Polynuclearphenols | 102 | 244 | 142 |
| Insoluble in 5 Wt. Percent KOH: | | | |
| Alkanes | | 112 | 112 |
| Thiophenols | | 67 | 67 |
| Phenols | | 639 | 639 |
| Other Hydrocarbons | | 302 | 302 |
| | 1,200 | 4,000 | 2,800 |

Illustrative of the application of the data presented hereinbefore to the treatment of fuel oil unstable with respect to color and/or sediment in a method wherein the alkali metal hydroxide treating solution is regenerated, is the method depicted in a highly schematic manner in the flow-sheet, Figure 13.

A fuel oil unstable with respect to color and/or sediment i. e., a fuel oil which after 24 hours storage at 212° F. or after 2 months storage at 100° F. in glass bottles has a color more than 2 units on the A. S. T. M. color scale greater than immediately after treating, is pumped from a source not shown through line 31 to line 33. An aqueous alkali metal hydroxide solution having a concentration such that oil treated therewith after 2 months storage in a glass bottle at 100° F. or 24 hours storage in a glass bottle at 212° F. has a color not darker than 2½ and a sediment content not in excess of 2 milligrams per 100 milliliters, and said aqueous alkali metal hydroxide solution having a maximum concentration which can be used without causing difficulty in the extraction system because of crystallization or emulsification and preferably about 45 to about 55 weight percent alkali metal hydroxide is introduced into line 33 from line 32 in the ratio of about 0.2 to about 0.05 volume of alkali metal hydroxide solution to each volume of oil to be treated. The oil to be treated and aqueous alkali metal hydroxide treating solution are intimately mixed as by means of an orifice mixer, an agitator or the like, and flows to settler 34. It will be understood by those skilled in the art that while only one mixing and settling stage is shown, mixing and settling can take place in a plurality of stages as in a counter-current extracting system.

In settler 34 the fouled aqueous extracting solution is drawn off through line 48 while the treated oil leaves settler 34 through line 35. The path of the treated oil will be followed first and then the course of the fouled treating solution through regeneration thereof and return to the treating section.

The treated oil flows through line 35 to line 45 where washwater flowing from coalescer 36 through lines 37, 38, 41 and 42 under control of valve 44 is mixed with the treated oil to dissolve and to remove alkali metal hydroxide with which the oil is contaminated. Orifice mixers or other mixers of suitable type can be interposed between line 45 and settler 39 wherein the wash-water is separated from the treated oil.

In settler 39 the water-washed, treated oil rises to form an upper layer and flows therefrom through line 46 to coalescer 36. The wash-water leaves settler 39 through pipe 40 to mix with the wash-water separated in coalescer 36 and flowing therefrom through pipes 37 and 38 to pipe 41.

In coalescer 36 the droplets of wash-water entrained in the water-washed, treated oil agglomerate and settle to the bottom of the coalescer while the water-washed, treated fuel oil, stable with respect to color and/or sediment, flows from coalescer 36 through line 47 to storage and/or distribution.

Returning now to settler 34. The fouled aqueous treating solution flows therefrom through pipe 48 to pipe 49. In pipe 49 a portion of the water from coalescer 36 and settler 39 containing alkali metal hydroxide flowing therefrom through pipes 37, 38, 40, 41 and 43 is mixed with the fouled aqueous treating solution. The diluted treating solution flows through pipe 49 to dehydrator 50 of any suitable design and construction such as a simple still wherein the fouled treating solution is concentrated to a degree such that the acidic material extracted from the treated oil now in the form of alkali metal salts forms an upper layer when cooled to about 100 to 150° F. and settled. The aforesaid salt layer will separate from the aqueous alkali metal hydroxide solution at about 100 to about 175° F. when the lower layer contains at least 30 weight percent caustic potash or at least 30 weight percent caustic soda.

The water evaporated from the fouled dilute treating solution passes overhead from dehydrator 50 through pipe 51 to condenser 52 and thence as condensate through line 53 to line 59 and thence to line 42 to be used to water-wash the treated oil in line 45. A portion of the condensate can be discharged from the system through line 62 under control of valve 63. From time to time, as operation requires, fresh water can be introduced into the system from a source not shown through pipe 57 under control of valve 58.

Returning now to the fouled concentrated treating solution in dehydrator 50. The fouled concentrated treating solution flows from dehydrator 50 through pipe 54 to cooler 55 and thence through pipe 56 to settler 60.

In settler 60 the alkali metal salts of acidic material extracted from the treated oil form an upper layer and are drawn off through pipe 61 to a recovery system or to waste. As a result of the separation of the alkali metal salts of the acidic material, the aqueous treating solution is regenerated and ready for re-use in extracting components of fuel oil which, per se, or potentially, are the source of the instability of the oil.

The regenerated aqueous alkali metal hydroxide solution forming the lower layer in settler 60 flows therefrom through line 62 to line 32 and thence to line 33 for re-use in treating unstable fuel oil.

The amount of alkali metal hydroxide withdrawn from the system through pipe 61 is not of economic importance relative to the total amount of alkali metal hydroxide employed since the salt layer in settler 60 usually represents about 1 to about 10 percent of the total alkali metal hydroxide employed per unit of time.

The use of a combination of caustic soda and caustic potash in treating fuel oil to stabilize the same with respect to color and/or sediment is illustrated in a highly schematic manner in Figure 14. Those skilled in the art will understand that, although only one mixing and one settling stage is illustrated in each of the caustic soda and caustic potash treatments, a plurality of such stages in one or both treatments can be used.

Oil to be stabilized with respect to color and/or sediment flows from a source not shown through line 100.

Aqueous caustic soda solution of suitable strength flowing from settler 101 through pipe 102 is introduced into line 100 and the mixture flows through orifice mixer 103 or other suitable mixer providing intimate contact of the oil and aqueous treating solution to line 104. From line 104 the mixture flows to settler 105.

In settler 105 the partially treated oil forms the upper layer and flows therefrom through line 106. The fouled aqueous caustic soda solution forms the lower layer and flows from settler 105 through pipe 122 under control of valve 125. All or a part of the fouled caustic soda solution can be directed along pipe 123 to pipe 102 to contact further amounts of oil. Generally, a major portion or all of the fouled treating solution flows from pipe 122 to pipe 124 and then, dependent upon the concentration of the caustic soda, flows wholly or in part through pipe 126 under control of valve 127 to dehydrator 128 or wholly or in part flows through line 132 under control of valve 133 to settler 101. Direction of flow to dehydrator 128 is dependent upon whether or not the concentration of free caustic soda in the fouled treating solution is high enough to provide reasonably clean separation as an upper layer of the sodium salts of the acidic material extracted from the treated oil. A reasonably clean separation at about 100° to about 150° F. is obtained when the free caustic soda is at least 30 weight percent. At lower separation temperatures lower concentrations are effective and at higher separation temperatures concentrations higher than 30 weight percent are required in settler 101.

When the concentration of free alkali in the fouled caustic soda treating solution is less than that at which reasonably clean i. e., industrially practical, separation can be obtained in settler 101 at least sufficient of the fouled treating solution is directed to dehydrator 128 so that when dehydrated and returned to pipe 134, the concentration of free caustic in the contents of pipe 134 will be such that reasonably clean separation is obtained in settler 101 between the caustic soda salts of the acidic material extracted from the oil and the aqueous regenerated caustic soda treating solution obtained thereby.

Accordingly, the contents of pipe 134 has a concentration of free caustic soda such that an upper layer of the sodium salts of the extracted acidic material and a lower layer of an aqueous caustic soda treating solution form in settler 101. The mixture flows to settler 101 where the upper layer of sodium salts flows therefrom through line 143 to recovery or waste, while the regenerated aqueous caustic soda solution flows from settler 101 through line 102 to line 103.

Returning to dehydrator 128. The water evaporated from the fouled caustic soda treating solution is taken overhead through pipe 129 to condenser 130 from which the condensate flows through pipe 131 back to pipe 102. From time to time, as operation requires, fresh water or fresh caustic soda treating solution is introduced into pipe 131 from a source not shown through pipe 144 under control of valve 145. When desirable or necessary, a portion of the condensate is discharged from the system through line 151 under control of valve 152.

Returning now to settler 105. The partially treated oil which forms the upper layer therein flows therefrom through line 106. Aqueous caustic potash solution flowing from settler 107 through pipe 108 is mixed therewith and the mixture passed through a mixer of suitable type 109 such as an orifice mixer. The intimately mixed oil and caustic potash solution flows through line 110 to settler 111 wherein the treated oil forms the upper layer. The treated oil flows from settler 111 through line 112 to line 118 where it is contacted with wash-water flowing from coalescer 113 through pipes 114 and 116 under control of valve 117. The mixture of treated oil and wash-water flows through pipe 118 to settler 119 where the treated oil forms the upper layer and the wash-water the lower layer.

The treated oil flows from settler 119 through line 120 to coalescer 113 where entrained wash-water settles out and is withdrawn through pipe 114 while the water-washed treated oil stabilized with respect to color and/or sediment flows to storage and/or distribution through line 121.

Returning to settler 111. The fouled aqueous caustic potash treating solution which forms the lower layer therein flows therefrom through pipe 115 to pipe 135 where wash-water containing caustic potash flowing through pipes 148 and 114 from settler 119 and from coalescer 113 through pipe 114 is mixed with the fouled aqueous caustic potash treating solution.

The diluted fouled caustic potash treating solution in pipe 135 flows to dehydrator 136 of any suitable type such as an evaporator where the fouled solution is evaporated to a concentration such that when cooled to about 100° to about 150° F. the potassium salts of the acidic material extracted from the treated oil from an upper layer. Such separation occurs when the concentration of free caustic potash is at least 30 weight percent. Lower concentrations are effective at lower separation temperatures.

The concentrated fouled aqueous caustic potash treating solution flows from dehydrator 136 through pipe 141 to cooler 149 where the concentrated fouled caustic potash solution is cooled to a temperature such that at the concentration of free caustic potash existing in line 141, the potassium salts of the acidic material extracted from the treated oil are insoluble in the aqueous caustic potash solution. When the concentration of free caustic is about 50 weight percent caustic potash (50° Bé.), the mixture in line 141 is cooled in condenser 149 to about 100° to about 150° F. The cooled concentrated fouled aqueous caustic potash treating solution comprising a mixture of aqueous caustic potash solution and solution-insoluble potash salts of acidic material extracted from the treated oil flows through pipe 150 to settler 107 wherein the solution-insoluble potash salts form the upper layer while the regenerated aqueous caustic potash solution substantially devoid of acidic material, coloring bodies, etc., forms the lower layer.

The upper layer of potash salts of the acidic material extracted from the treated oil flows from settler 107 through line 142 to a recovery system wherein the phenols and thiophenols, etc., can be recovered or to waste.

The regenerated aqueous caustic potash solution substantially devoid of material extracted from the treated oil flows from settler 107 through pipe 108 to pipe 106 to be mixed with partially treated fuel oil flowing therethrough from settler 105.

In general, extracting or treating temperatures are about 125° to about 175° F. and aqueous alkali metal hydroxide solutions containing about 15 to about 55 weight percent alkali metal hydroxide are used to stabilize the fuel oil with respect to color and/or sediment. However, it is to be noted that when the oil has satisfactory stability with respect to color but is unstable with respect to sediment, concentrations of caustic soda as low as 10 weight percent can be used. Thus, caustic soda treating solutions containing 10 to 55 weight percent caustic soda can be used alone or in combination with caustic potash treating solutions containing about 30 to about 55 weight percent caustic potash. The oil-to-treating solution volumetric ratio can be about 5:1 to about 20:1. The separation temperatures, i. e., temperatures at which the alkali metal salts of the extracted acidic material separate from the aqueous alkali metal hydroxide solution vary with the concentration of free alkali metal hydroxide and are about 100° to about 175° F. for solutions containing at least about 30 weight percent alkali metal hydroxide; the higher the concentration of free alkali metal hydroxide, the higher the temperature at which the aforesaid alkali metal hydroxide salts separate from the aqueous alkali metal hydroxide solution.

As is known to those skilled in the art, the stability of fuel oils with respect to color and/or sediment varies. A fuel oil such as that for which data have been presented hereinbefore is one which in the untreated state upon storage in a glass bottle for 2 months at 100° F. has a color 8 on the A. S. T. M. scale and a sediment of about 10 milligrams per 100 milliliters. Such an oil can be stabilized with respect to color and sediment by treatment with about 45 weight percent aqueous alkali metal hydroxide solution at an oil-to-solution ratio of about 100 volumes-to-1 volume, preferably about 5:1 to about 20:1. Less stable oils require a greater volume of alkali metal hydroxide solution of the same concentration or a substantially equal volume of solution of greater strength. More stable oils can be successfully treated with a smaller volume of solution of substantially the same concentration or a substantially equal volume of solution of lower concentration.

Those skilled in the art will understand that it is preferred to use treating solutions having a concentration of alkali metal hydroxide such that a minimum amount of evaporation is required to produce a solution from which the solution-insoluble salts of the extracted material will separate. In other words, the separation temperature and extracting temperatures are selected to require a minimum of dehydration of the fouled treating solution and minimum temperature rise in the regenerated solution prior to use in the extraction portion of the system. In other words, the heat requirements of the entire system are kept at an economically practical balance.

Those skilled in the art will recognize that the foregoing is a description of the extraction of illustrative types of acidic organic material with aqueous alkali metal hydroxide treating solutions having concentrations in the two-phase heterogeneous systems areas of ternary diagrams of the systems water, alkali metal hydroxide and acidic organic material to be extracted at the separation temperature. Those skilled in the art will also understand that the extracted acidic organic material is separated from the aqueous alkali metal hydroxide solution as an alkali metal salt of the extracted acidic organic material and at the same time the aqueous alkali metal hydroxide treating solution is regenerated for re-use in extracting additional acidic organic material. It will also be understood by those skilled in the art that when the alkali metal salt of the extracted acidic organic material is not the desired product, the acidic organic material can be recovered therefrom in any suitable manner. The separation temperature is that temperature at which the alkali metal salt of the acidic organic material is separated from the aqueous alkali metal hydroxide solution and is usually ambient temperature of about 150° F. and preferably about 80° to about 130° F.

Those skilled in the art will also understand that the organic solvent for the acidic organic material must be an organic material substantially inert to aqueous alkali metal hydroxide solutions used in extraction.

This application is a continuation-in-part of application Serial No. 351,168, filed April 27, 1953, now U. S. Patent No. 2,770,581, granted November 13, 1956.

We claim:

1. A method for producing a stabilized cracked distillate fuel oil having an A. S. T. M. color not darker than 4 after storage in a glass bottle at 100° F. for two months which comprises in a cyclic manner intimately mixing in an extraction zone unstable cracked distillate fuel oil containing contaminants including alkyl phenols and having an A. S. T. M. color darker than 4 after storage in a glass bottle at 100° F. for two months with only one reagent consisting of an aqueous solution containing as its sole essential solute at least about 35 percent by weight of alkali metal hydroxide to obtain a liquid mixture of treated oil, alkali metal salts of extracted acidic organic material and said reagent, stratifying said liquid mixture to obtain an uppermost layer comprising treated distillate fuel oil, an intermediate liquid layer comprising said alkali metal salts of extracted acidic organic material, and a bottom liquid layer comprising said reagent, separately removing each of said layers, water-washing said treated distillate fuel oil, separating water-washed treated distillate fuel oil from wash water, removing entrained wash water from said treated distillate fuel oil to obtain a stabilized cracked distillate fuel oil product having an A. S. T. M. color which does not become darker than 4 after storage in a glass bottle at 100° F. for two months, returning said separated bottom layer comprising regenerated reagent containing as its sole essential solute alkali metal hydroxide to said extraction zone while maintaining the alkali metal hydroxide content thereof at least about 35 percent by weight, and contacting unstable cracked distillate fuel oil with said separated bottom layer only.

2. The method described in claim 1 wherein the distillate fuel oil is catalytically cracked distillate fuel oil.

3. The method described in claim 1 wherein the alkali metal hydroxide is sodium hydroxide.

4. The method described in claim 1 wherein the alkali metal hydroxide is potassium hydroxide.

5. The method described in claim 1 wherein the distillate fuel oil is catalytically cracked distillate fuel oil, and wherein the alkali metal hydroxide is sodium hydroxide.

6. The method described in claim 1 wherein the distillate fuel oil is catalytically cracked distillate fuel oil, and wherein the alkali metal hydroxide is potassium hydroxide.

References Cited in the file of this patent

UNITED STATES PATENTS

| | | |
|---|---|---|
| 1,761,328 | Chappell | June 3, 1930 |
| 1,935,725 | Pier et al. | Nov. 21, 1933 |
| 2,202,039 | Yabroff et al. | May 28, 1940 |
| 2,228,028 | Brower | Jan. 7, 1941 |
| 2,270,491 | Yabroff et al. | Jan. 20, 1942 |
| 2,345,449 | Birkhimer | Mar. 18, 1944 |
| 2,556,438 | Parker et al. | June 12, 1951 |
| 2,719,109 | Harper et al. | Sept. 27, 1955 |
| 2,770,581 | Brooks et al. | Nov. 13, 1956 |

UNITED STATES PATENT OFFICE

CERTIFICATE OF CORRECTION

Patent No. 2,868,722 January 13, 1959

Frank W. Brooks, Jr. et al.

It is hereby certified that error appears in the printed specification of the above numbered patent requiring correction and that the said Letters Patent should read as corrected below.

Column 8, line 22, Table II, first column thereof, under "Phenols:" for "Pylenols" read -- Xylenols --.

Signed and sealed this 28th day of July 1959.

(SEAL)
Attest:
KARL H. AXLINE
Attesting Officer

ROBERT C. WATSON
Commissioner of Patents